United States Patent
Dwivedi et al.

(10) Patent No.: US 9,910,747 B2
(45) Date of Patent: Mar. 6, 2018

(54) PARALLEL MIRRORED COPYING WITH WRITE CONSISTENCY

(71) Applicant: International Business Machines Corporation, Armonk, NY (US)

(72) Inventors: Anushka Dwivedi, Lucknow (IN); Prateek Goel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/484,748

(22) Filed: Sep. 12, 2014

(65) Prior Publication Data

US 2016/0077928 A1    Mar. 17, 2016

(51) Int. Cl.
  G06F 11/00    (2006.01)
  G06F 11/20    (2006.01)
  G06F 11/14    (2006.01)

(52) U.S. Cl.
  CPC ...... G06F 11/2082 (2013.01); G06F 11/1441 (2013.01)

(58) Field of Classification Search
  CPC ............. G06F 11/1469; G06F 11/1451; G06F 11/1464; G06F 11/1658–11/167; G06F 11/1441; G06F 11/2008
  See application file for complete search history.

(56) References Cited

U.S. PATENT DOCUMENTS

| | | | |
|---|---|---|---|
| 5,636,356 A * | 6/1997 | Kakuta | G06F 11/2094 711/114 |
| 6,606,694 B2 | 8/2003 | Carteau | |
| 6,636,984 B1 | 10/2003 | McBrearty et al. | |
| 7,103,796 B1 | 9/2006 | Kekre et al. | |
| 7,340,640 B1 * | 3/2008 | Karr | G06F 3/0613 711/209 |
| 8,595,455 B2 | 11/2013 | Chatterjee et al. | |
| 9,436,563 B2 * | 9/2016 | Chinnakkonda | G11C 14/009 |
| 2005/0071388 A1 * | 3/2005 | Fienblit | G06F 11/2074 |
| 2005/0071549 A1 * | 3/2005 | Tross | G06F 11/2076 711/113 |
| 2007/0162561 A1 | 7/2007 | Ohara et al. | |
| 2011/0022801 A1 | 1/2011 | Flynn | |
| 2014/0136887 A1 | 5/2014 | Murakami | |

OTHER PUBLICATIONS

"Mirror write consistency", IBM AIX 6.1 Information Center, © Copyright IBM Corporation 1989, 2013, <http://pic.dhe.ibm.com/infocenter/aix/v6r1/index.jsp?topic=%2Fcom.ibm.aix.prftungd%2Fdoc%2Fprftungd%2Fmirror_write_consistency.htm>.

* cited by examiner

*Primary Examiner* — Jason Bryan
(74) *Attorney, Agent, or Firm* — Alexander G. Jochym

(57) ABSTRACT

A method, computer program product and/or system for facilitating data access that performs the following steps (not necessarily in the following order): (i) generating a Mirror Write Consistency (MWC) record associated with a data portion stored on a data storage device (ii) saving a dynamic copy of the MWC record in a manner such that the MWC record is more readily accessible for read and write operations than the data portion stored on the data storage device. At least the generating and making step is performed by computer software running on computer hardware.

9 Claims, 4 Drawing Sheets

PARALLEL MIRRORED COPYING WITH WRITE CONSISTENCY

BACKGROUND OF THE INVENTION

The present invention relates generally to the field of mirror copies of data stored on a data storage device, and more particularly to Mirror Write Consistency (MWC).

Mirror Write Consistency is the name of a parameter associated with a data portion (for example, a Logical Volume (LV)). In conventional systems, the MWC parameter associated with the data portion is a one-bit (Yes or No) value. This binary MWC value indicates that all mirror copy(ies) for the data portion have been completely made (this is sometimes referred to as the "mirror copy(ies) being in sync"). If the MWC value indicates that all mirror copies are in sync, then read operations can read data from any mirror copy (based, for example, on efficiency concerns), rather than necessarily accessing the original version of the data.

In some conventional systems, the Logical Volume Manager (LVM) ensures data consistency among mirrored copies of a logical volume during normal I/O processing. For every write to a logical volume, the LVM generates a write request for every mirrored copy. A problem arises if a logical volume hosting one of the mirrored writes crashes in the middle of processing a mirrored write (before all copies are written). If mirror write consistency recovery is requested for a logical volume, the LVM keeps additional information to allow recovery of these inconsistent mirrors. In some conventional systems, MWC recovery is performed for most mirrored logical volumes.

In some conventional systems, the MWC record consists of one sector near the beginning (outer edge) of each disk. This MWC record maintains the information of recent writes in memory until some predetermined number of writes have been performed. After the predetermined number of write operations have occurred, the MWC record flushes this information into persistent storage and then actual data. The MWC record identifies which logical partitions may be inconsistent if the system shuts down incorrectly.

One term used throughout this application is varyon. To varyon or vary a volume group back online means that the volume group is made available for users for access and use. When a volume group is varied back online, the volume group is made available to the system by the LVM reading information about the volume group to initialize the volume device drive structures with the information about the volume group. When the volume group is varied back online, the MWC record is used to make the logical partitions consistent again.

SUMMARY

According to an aspect of the present invention, there is a method, computer program product and/or system for facilitating data access that performs the following steps (not necessarily in the following order): (i) generating a Mirror Write Consistency (MWC) record associated with a data portion stored on a data storage device (ii) saving a dynamic copy of the MWC record in a manner such that the MWC record is more readily accessible for read and write operations than the data portions stored on the data storage device. At least the generating and making step is performed by computer software running on computer hardware.

DETAILED DESCRIPTION

Figure 1:
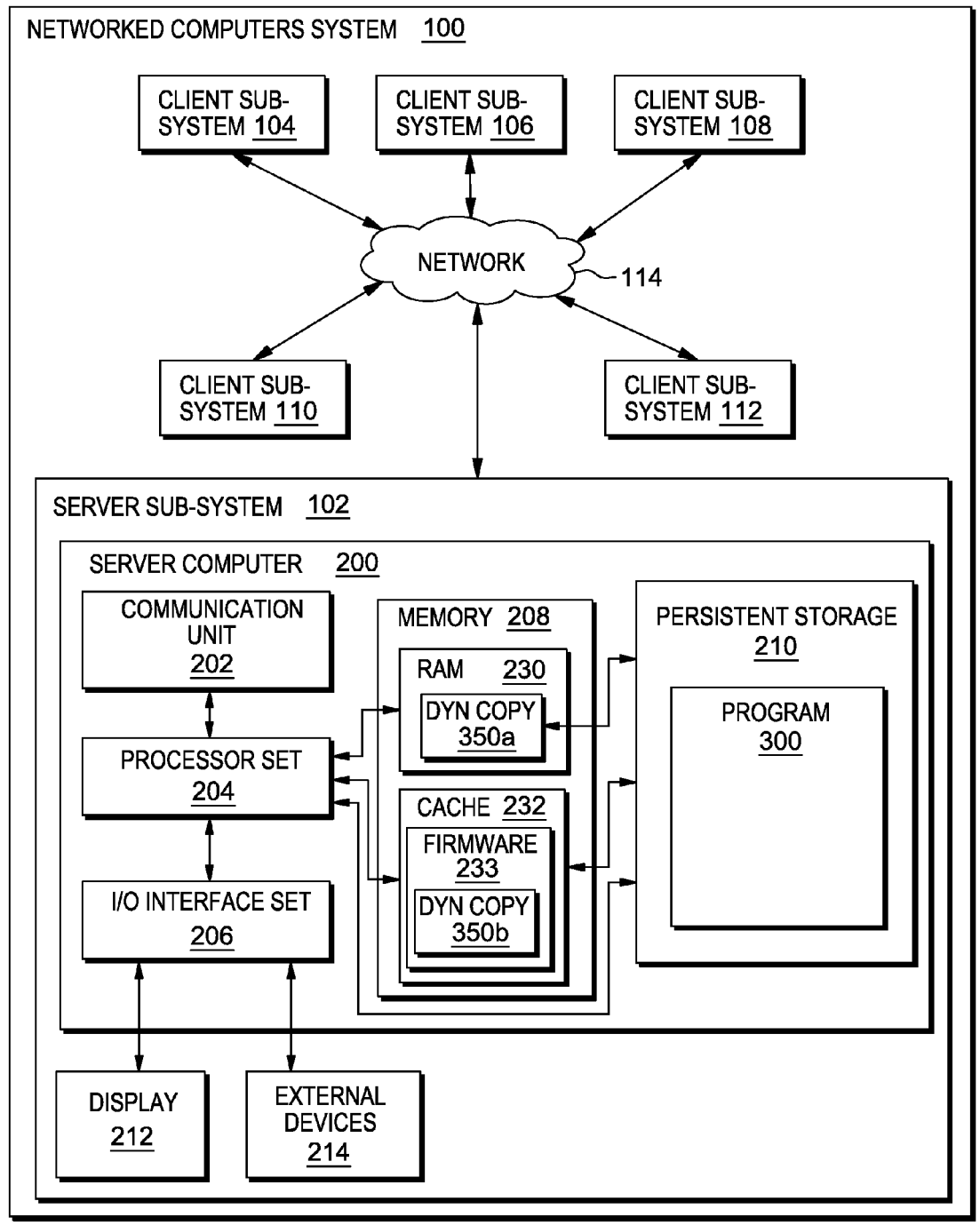
FIG. 1 is a block diagram view of a first embodiment of a system according to the present invention.

In some embodiments of the present invention, a Mirror Write Consistency (MWC) value for a data portion (for example, a data block) is maintained as a "dynamic copy" on a volatile memory device. A "dynamic copy" is defined, for purposes of this document, as a copy of MWC data that is more readily accessible for reading and/or writing than the stored data to which MWC data relates. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; firmware 233; program 300; and DYN copy 350 (including DYN copy portion 350a in random access memory (RAM) 230 and DYN copy portion 350b in firmware 233 of cache 232).

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
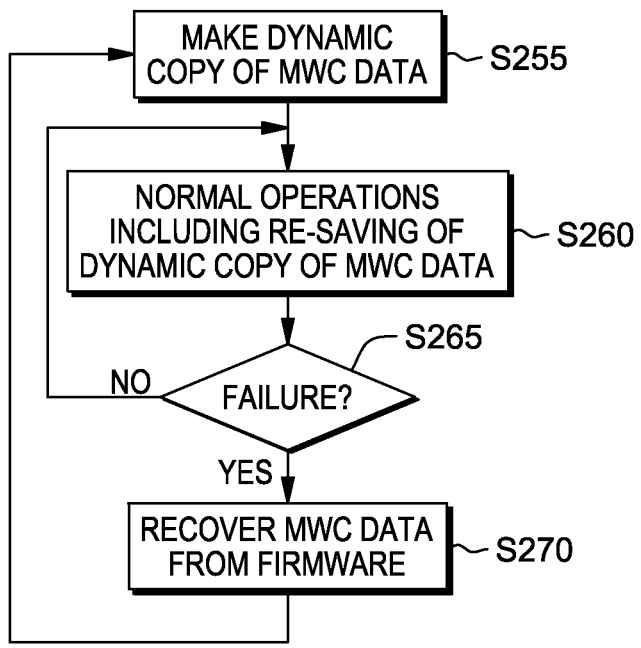
FIG. 2 is a flowchart showing a first embodiment method performed, at least in part, by the first embodiment system.
Figure 3:
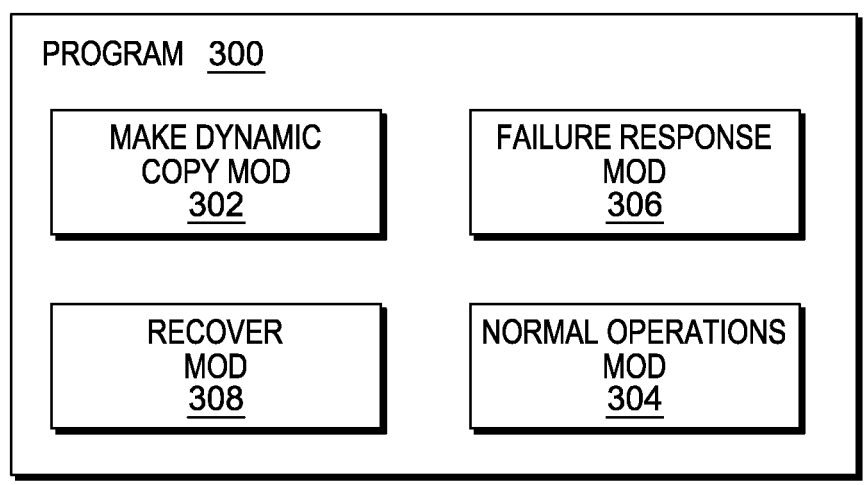
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where make dynamic copy module 302 makes a dynamic copy of Mirror Write Consistency (MWC) data. In doing so, the Logical Volume Manager (LVM) issues a parallel write to a plurality of mirrored copies. The mirrored copies may be located on persistent storage 210, an external device 214 (i.e. a flash drive, external hard drive, etc.), any one of the client sub-systems 104, 106, 108, 110, 112 found within networked computers system 100, or any other location accessible via network 114. The location of a mirrored copy is also referred to as a "mirrored location." Program 300 creates DYN copy 350.

DYN copy 350 contains information about a first successful write, in a parallel mirroring system, where a LVM has issued a write to parallel copies. The first successful write is marked as the latest primary copy. The latest primary copy can change dependent upon the first successful write when multiple writes are issued and/or for an independent write request. The DYN copy 350 contains the ID used to identify the latest primary copy, the physical partition of the disk where the latest primary copy is located, the offset at which the latest primary copy is being written, and the size of the data being written for the parallel write. The DYN copy 350 is updated at every issued write upon a first successful write and therefore the latest primary copy can change. DYN copy 350 is located within both RAM 230 and cache 232. In another embodiment, DYN copy 350 is located in RAM 230. In yet another embodiment, DYN copy 350 is located within cache 232 with the help of firmware 233 or any other location within networked computers system 100.

In other words, LVM has issued a parallel write to all mirrored copies of a piece of data. The piece of data (not shown) to be parallel written to all mirrored copies may be found anywhere within networked computers system 100.

DYN copy 350 contains an ID used to identify the latest primary copy (in this case the original copy), the physical partition of the disk (where the original copy is located), the offset at which the latest primary copy is being written, and the size of the data being written. Program 300, upon creating DYN copy 350, updates DYN copy 350 with information regarding the piece of data.

During operation of a computer system, processing can proceed to step S255 any time MWC value(s) are changed. Flowchart 250 shows just one possible sequence and/or time ordering in which operations may occur.

In this embodiment, the MWC values that make up the information of DYN copy 350 are not different than MWC values stored in non-volatile storage in conventional Mirror Write (MW) systems with the addition of additional information found in DYN copy 350, discussed above. However, DYN copy 350 is quicker and easier to access (to read, to update) than MWC values stored in: (i) random access memory (DYN copy portion 350*a*); and/or (ii) a firmware-based cache (DYN copy portion 350*b*). In this embodiment, both of the random access memory and firmware-based cache are forms of volatile memory. Although it is not necessarily required that the DYN copy be made in volatile memory, under currently-conventional technology, volatile memory tends to be much more readily read/write accessible than large volume persistent data storage devices (for example, disk drives) where mirrored data is generally stored. It is not merely that the MWC values are stored in a volatile memory, but also that they are stored in a way that MWC values can be found and accessed quickly upon command. This is potentially very helpful because MW functionality can be performed more reliably and efficiently when there is an "imminent failure condition" of a logical volume and/or partition hosting at least one of the mirrored copies (see definition of "imminent failure condition," below in the Definitions sub-section). In various embodiments of the present invention, there may be other uses for DYN copy 350 that occur during normal operations of the computer system, even in the absence of an imminent failure condition.

Processing proceeds to step S260, where normal operations module 304 continues to perform normal operations related to the LVM, issuing a parallel write to all mirrored copies (including updating the DYN copy 350 with MWC data). When a write operation is completed at one of the mirrored locations, if that mirrored location is the first mirrored location to complete the write operation, the mirrored location becomes the location of the DYN copy 350. In other words, if a mirrored location is the first location to complete a copy, DYN copy 350 is updated with information about that specific location. For example, the ID used to identify the primary copy (in this case the new location), the physical partition of the disk (where the new copy is located), the offset at which the copy is being written and the size of the data being written for that copy are recorded in DYN copy 350. If a location finishes a write of a mirrored copy but is not the first location to finish the write, then this location does not become DYN copy 350. Upon completion of the parallel write to all mirrored copies, LVM may issue a subsequent parallel write to all or some of the mirrored copies. In the case of two parallel writes completing at the same time, the first write to communicate a completion signal to LVM will be treated as the primary copy.

In an embodiment, DYN copy 350 can change a plurality of times dependent upon locations being the first to return a successful mirrored write. DYN copy 350 can have information regarding the mirrored copy found in location A, then change to the mirrored copy found in location B (based on a second mirrored write), then change to the mirrored copy found in location C (based on a third mirrored write), and then change back to the mirrored copy found in location A (based on a fourth mirrored write). Alternatively, DYN copy 350 may never change in a scenario where one location is always the first to complete the mirrored write and all other locations take a longer period of time to complete the mirrored write.

Processing proceeds to step S265, where failure response module 306 determines if there has been a crash or failure to a logical volume and/or partition that caused at least one of the mirrored writes to stop. If there has been no crash or failure (step S265, no branch), program 300 returns to S260 and continues to perform normal operations as discussed previously. However, when a crash or failure happens in server sub-system 102 (step S265, yes branch), the logical volume and/or partition may crash, including the parallel write to at least one of the mirrored copies.

In the case of an "imminent failure condition" of a logical volume and/or partition hosting at least one of the mirrored copies, processing proceeds to step S270, where recover module 308 uses the information found in DYN copy 350 to restore, recreate, and resume the normal operations related to the parallel write of all mirrored copies. Upon the failed logical volume and/or partition restoring itself, program 300, upon a user input or invoked automatically as part of a logical partition's restore process, accesses DYN copy 350 and retrieves the information found therein. Program 300 then determines the parallel write of all mirrored copies that was occurring at the time of "imminent failure condition" of the logical partition hosting at least one of the mirrored copies.

In an embodiment, using the information found in DYN copy 350, program 300 determines the location of the first write to be marked as a successful write in the parallel mirrored writes. Program 300 extracts information about this last write from DYN copy 350, including: (i) the ID used to identify the latest primary copy (in this case the original copy); (ii) the physical partition of the disk (where the original copy is located); (iii) the offset at which the latest primary copy is being written; and (iv) the size of the data being written. Program 300, using the LVM, determines the locations of the parallel writes.

Using the LVM, program 300 determines, based on the size of the data contained in DYN copy 350, which copies of the parallel written copies have completed a successful write. For example, the LVM may perform parallel writes to 5 locations, such as client sub-systems 104, 106, 108, 110, 112. In this embodiment, client sub-system 104 contains the first completed successful write (not shown). The size of this write, as per information found in DYN copy 350, is 76.23 megabytes (MB). Therefore, using the size of the write, program 300 can determine if the writes have been successful in the other locations. For example, client sub-systems 106, 108 may have writes of 74.9 MB and client sub-systems 110, 112 may have writes of 76.23 (MB). Program 300 determines that the parallel writes haven't been completed on client sub-systems 106, 108 and indicates to the LVM that the parallel writes should be issued again to those locations, using the write found in DYN copy 350, from client sub-system 104, as the source file.

In an alternative embodiment, DYN copy 350 may contain information regarding not only the first parallel written copy to have issued a completed successful write, but all parallel written copies to have issued a completed successful write. In this embodiment, any written copy that has not indicated a completed successful write will, via the LVM, be issued the parallel write using the information found from the first completed successful write. In other words, the LVM will issue a parallel write to all locations that have not had the successful write, using the data, information, or version found at the location of the first completed successful write, using information found in DYN copy 350.

III. Further Comments and/or Embodiments

Some embodiments of the present invention recognize the following facts, potential problems and/or potential areas for improvement with respect to the current state of the art: (i) it is a known problem in the art that in the event of a an abrupt system shutdown, there is a need to keep copies consistent which are configured with the parallel mirroring method; (ii) known solutions suffer from well talked about and discussed performance impacts in both active and passive modes; (iii) known solutions come at the expense of write performance degradation, particularly in the case of a random write; (iv) with existing solutions slower read operations may occur until all the partitions have been resynchronized; (v) existing solutions keep information of the last 62 distinct writes incurring an extra disk write upon every new $63^{rd}$ write causing a performance impact; (vi) existing solutions synchronize the last 62 writes causing a performance impact; (vii) existing solutions, upon reboot, before varyon (also sometimes referred to as "vary-on"), the system checks for consistent Logical Track Groups (LTG) and syncs all versions using that LTG and therefore writes to mirror copies may be lost.

Some embodiments of the present invention may include one, or more, of the following features, characteristics and/or advantages: (i) the use of a dynamic primary copy concept wherein at every write, the copy which acknowledges successful write first at the Logical Volume Manager (LVM) layer is made as the primary copy; (ii) performing a copy at every write so that the copy returning the first successful write may change (and hence is termed as a dynamic primary copy); (iii) preserving a copy's details in memory as opposed to existing MWC methods where LTG are used and kept in disk; (iv) since copy information is maintained in memory, using firmware to preserve copy information and make the rebooted version of the Operating System aware of copy information to sync and update the copies; (v) all aspects of parallel mirroring are maintained as is; and (vi) there is a performance gain as there is no intermediate write of latest information to disk.

As used herein, the details of a mirrored copy include the following: (i) the ID used to identify the copy; (ii) the physical partition of the disk; (iii) the offset at which the data is being written; and (iv) the size of the data to be written. The data being written, to later check if it was written successfully and to sync the rest of the copies, may be saved using that data.

Figure 4:
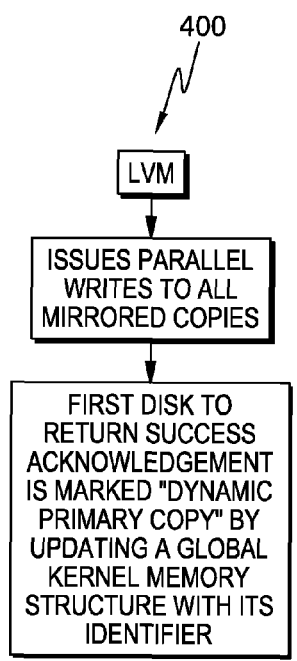
FIG. 4 is a flowchart showing a second embodiment method according to the present invention.

As shown by workflow 400 in FIG. 4, LVM issues a command write to mirror copies in a parallel manner. The first disk to respond back with an indication of a successful write is marked as the latest primary copy. This happens at every write, which means the primary copy details can change, hence the name is "Dynamic Primary Copy." That way the LVM can identify the latest completed write and copy that is completed on the LVM layer. This dynamic primary copy's details (such as the ID of the copy) are preserved by using a global kernel structure. The global kernel structure is used because there could be more than one mirrored copies setup on a system.

Figure 5:
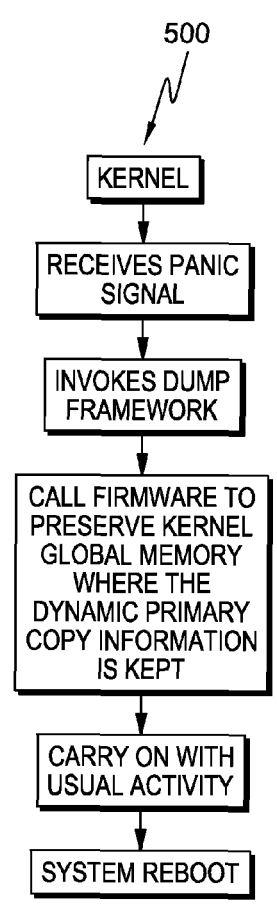
FIG. 5 is a flowchart showing a third embodiment method according to the present invention.

FIG. 5 discusses how to preserve this global kernel structure across reboot. As shown by workflow 500, when the system gets a panic signal, the system invokes a dump framework to save the state of the system for further analysis. This dump framework is aware of the proposed global kernel structure invokes a firmware call suggesting to save the data in this structure. Upon completing this, the dump framework continues with regular activity and reboots the system. At this point the information about the latest copy has been saved with the help of firmware. The information just needs to be retrieved upon reboot, and the copies synced based on the retrieved information.

Figure 6:
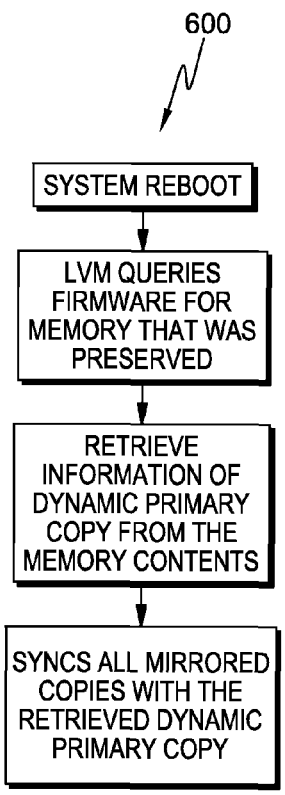
FIG. 6 is a flowchart showing a fourth embodiment method according to the present invention.

As shown by workflow 600 in FIG. 6, upon reboot before varyon of the volume groups, LVM queries the firmware to give the details which were stored prior to reboot. LVM then uses the copy matching the ID received from firmware to sync all of the copies participating in the mirroring, based on the previous successful writes. Hence, no data is lost and the run time execution performance is improved by eliminating the flush of LTG to disk whenever full. Additionally, there is no penalty at boot time to sync the copies.

The present invention can be extended to have firmware preserve additional information, such as data issued for writing and physical partition details where the data needs to be written. Upon reboot, the LVM will fetch this additional information and verify this last write issued for success or fail status. If it was a success, then all copies can be synced based on this copy. If it was a fail, then the last write is finished and all copies are synced based on this copy.

Figure 7:
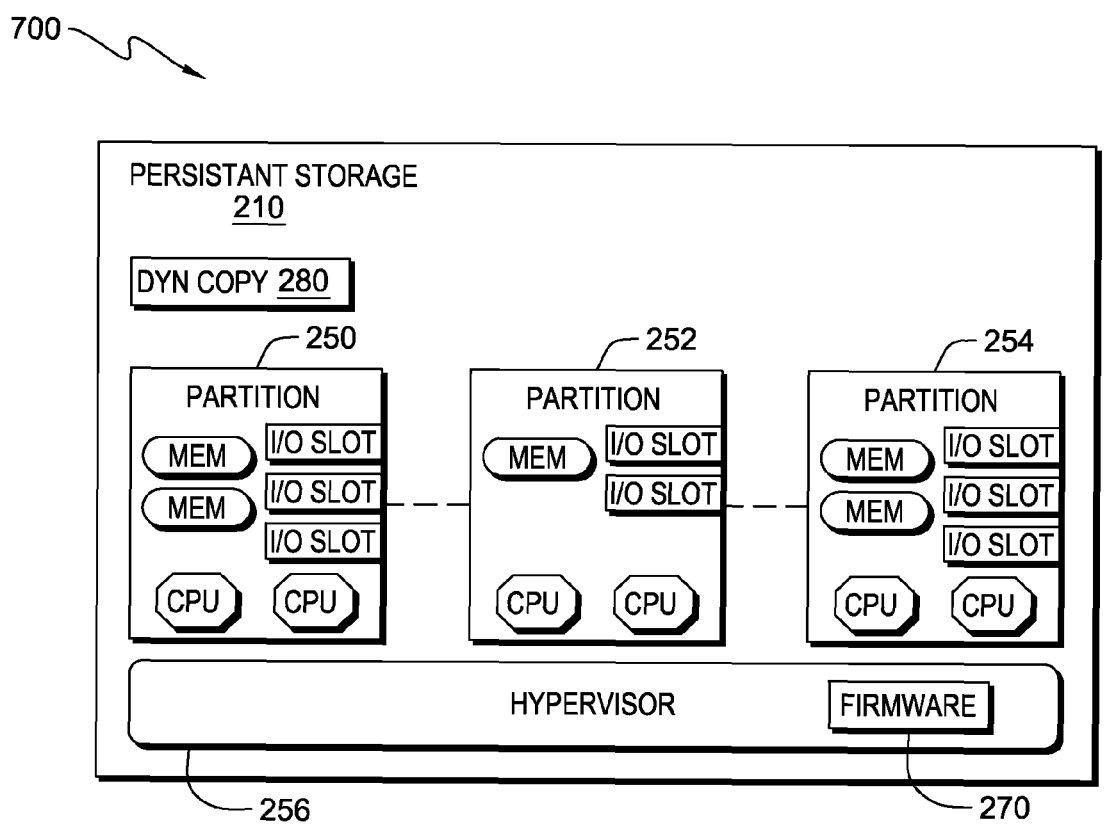
FIG. 7 is a block diagram view of a fifth embodiment of a system according to the present invention.

In an alternative embodiment, as shown in FIG. 7, program 300 can function in a virtual environment 700. Virtual environment 700 is an environment found in persistent storage 210, wherein a part of persistent storage is split into partitions 250, 252, 254. Each partition includes memory, cpu processing, and/or input/output slots. Virtual environment 700 also includes DYN copy 280 and hypervisor 256. DYN copy 280, discussed previously, contains information regarding the first disk to revert back with a successful write. Hypervisor 256 delivers functions that enable capabilities including dedicated-processor partitions, micro-partitioning, virtual processors, IEEE VLAN compatible virtual switch, virtual Ethernet adapters, virtual SCSI adapters, virtual Fiber Channel adapters, and virtual consoles. Hypervisor 256 also includes a firmware layer 270, hosted between the operating system(s) and the server hardware.

In this embodiment, hypervisor 256, by itself or in conjunction with LVM, issues a parallel write to all mirrored copies of a piece of data. In this embodiment, partition 250, 252, 254 are the potential locations of the mirrored copies. Upon the first successful mirrored write, for example at partition 250, returned to hypervisor 256 by any of the partitions, hypervisor 256 updates DYN copy 280 with the ID used to identify: (i) the latest primary copy (in this case the first successful mirrored write); (ii) the physical partition of the disk (where the first successful mirrored write is located); (iii) the offset at which the latest primary copy is being written; and (iv) the size of the data being written. In an alternative embodiment, any subsequently completed mirror writes, for example at partition 252, 254 may be indicated in DYN copy 280.

In the event of a logical volume and/or partition crash or failure, hypervisor 256, by itself or in conjunction with firmware 270, preserves DYN copy 280 and prevents it from being erased. In other words, hypervisor 256 may move DYN copy 280 to a location that is registered as a memory location to be preserved across system failure. This insures that DYN copy 280 is never erased and available at the time of a subsequent system boot. Upon system boot, hypervisor 256 returns to standard virtual memory operations in virtual environment 700. If hypervisor 256 detects a system crash or failure previously, hypervisor 256 accesses DYN copy 280 and determines the location of the first completed mirror write. In the present invention, DYN copy 280 contains information related to partition 250, as it was the first completed mirrored write. Hypervisor 256 determines, based on the information found in DYN copy 280, which locations have completed a successful mirrored write and which locations have not completed a successful mirrored write. Any locations that are determined to have not completed a successful mirrored write are issued a mirrored write using the first completed mirrored write as the source for the future writes. Hypervisor 256 continues normal operations related to parallel mirrored writes upon all partitions containing the most up to date mirrored write.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Mirror Write Cache: Any manner of storing Mirror Write Consistency data so that it is readily accessible during read operation of mirrored data.

Imminent failure condition: any notice, or other operational condition, indicating that a loss of operations may soon occur; the types of "failure" that may be indicated include, but are not limited to, the following: (i) system crash requiring power down; (ii) system crash not requiring power down; (iii) system freeze requiring power down; (iv) system freeze not requiring power down; (v) loss of power; (vi) serious slowdown in operations that may not technically be considered as a crash or a freeze; (vii) any situation wherein the Mirror Write is halted and/or terminated.

What is claimed is:

1. A method for facilitating data access, the method comprising:
    generating a Mirror Write Consistency (MWC) record associated with a data portion stored on a data storage device;
    saving a dynamic copy of the MWC record, wherein the dynamic copy is saved in a volatile storage device;
    receiving a parallel mirrored write request of the data portion stored on the data storage device, wherein the parallel mirrored write request of the data portion writes the data portion on two or more data storage devices;
    determining, by one or more computer processors, a first completed in time parallel mirrored write of the data portion stored on the data storage device on a first storage device of the two or more storage devices;
    updating, by one or more computer processors, the MWC record to indicate the first completed in time parallel mirrored write of the data portion stored on the data storage device on the first data storage device of the two or more data storage devices;
    receiving, by one or more computer processors, an indication of a failure of at least one parallel mirrored write request of the data portion on the data storage device to one or more data storage devices of the two or more data storage devices, wherein the failure causes the at least one of the parallel mirrored write requests to the one or more data storage devices of the two or more data storage devices to not occur;
    responsive to receiving the indication of the failure of the at least one parallel mirrored write requests of the data portion on the data storage device to one or more data storage devices of the two or more data storage devices, determining, by one or more computer processors, a size of the first completed in time parallel mirrored write of the data portion on the data storage device;
    determining, by one or more computer processors, one or more parallel mirrored write request that are a different size than the size of the first completed in time parallel mirrored write of the data portion on the data storage device; and
    updating the one or more parallel mirrored write request that are a different size than the size of the first completed in time parallel mirrored write of the data portion on the data storage device using the MWC record, wherein the indicated first completed in time parallel mirrored write of the data portion on the data storage device is used to update the one or more parallel mirrored write request that are a different size than the size of the first completed in time parallel mirrored write of the data portion on the data storage device.

2. The method of claim 1, wherein the MWC record includes one or more of the following: (i) a ID used to identify a first completed in time parallel mirrored write of the data portion on the data storage device; (ii) a physical partition of a disk where the first completed in time parallel mirrored write of the data portion on the data storage device is located; and/or (iii) an offset at which the first completed in time parallel mirrored write of the data portion on the data storage device is written.

3. The method of claim 1, wherein the volatile storage device includes at least one of the following: (i) a random access memory portion located in a random access memory; and/or (ii) a firmware cache portion located in a firmware cache.

4. A computer program product for facilitating data access, the computer program product comprising a computer readable storage medium having stored thereon:
    first program instructions programmed to generate a Mirror Write Consistency (MWC) record associated with a data portion stored on a data storage device;

second program instructions programmed to save a dynamic copy of the MWC record, wherein the dynamic copy is saved in a volatile storage device;

third program instructions programmed to receive a parallel mirrored write request of the data portion stored on the data storage device, wherein the parallel mirrored write request of the data portion writes the data portion on two or more data storage devices;

fourth program instructions to determine a first completed in time parallel mirrored write of the data portion stored on the data storage device on a first storage device of the two or more storage devices;

fifth program instructions programmed to update the MWC record to indicate the first completed in time parallel mirrored write of the data portion stored on the data storage device on the first data storage device of the two or more data storage devices;

sixth program instructions programmed to receive an indication of a failure of at least one parallel mirrored write request of the data portion on the data storage device to one or more data storage devices of the two or more data storage devices, wherein the failure causes the at least one of the parallel mirrored write requests to the one or more data storage devices of the two or more data storage devices to not occur;

seventh program instructions programmed to, responsive to receiving the indication of the failure of the at least one parallel mirrored write requests of the data portion on the data storage device to one or more data storage devices of the two or more data storage devices, determine a size of the first completed in time parallel mirrored write of the data portion on the data storage device;

eighth program instructions programmed to determine one or more parallel mirrored write request that are a different size than the size of the first completed in time parallel mirrored write of the data portion on the data storage device; and ninth program instructions programmed to update the one or more parallel mirrored write request that are a different size than the size of the first completed in time parallel mirrored write of the data portion on the data storage device using the MWC record, wherein the indicated first completed in time parallel mirrored write of the data portion on the data storage device is used to update the one or more parallel mirrored write request that are a different size than the size of the first completed in time parallel mirrored write of the data portion on the data storage device.

5. The product of claim 4, wherein the MWC record includes one or more of the following: (i) a ID used to identify a first completed in time parallel mirrored write of the data portion on the data storage device; (ii) a physical partition of a disk where the first completed in time parallel mirrored write of the data portion on the data storage device is located; and/or (iii) an offset at which the first completed in time parallel mirrored write of the data portion on the data storage device is written.

6. The product of claim 4, wherein the volatile storage device includes at least one of the following: (i) a random access memory portion located in a random access memory; and/or (ii) a firmware cache portion located in a firmware cache.

7. A computer system for facilitating data access, the computer system comprising:
a processor(s) set; and
a computer readable storage medium;

wherein:
the processor set is structured, located, connected and/or programmed to run program instructions stored on the computer readable storage medium; and
the program instructions include:
first program instructions programmed to generate a Mirror Write Consistency (MWC) record associated with a data portion stored on a data storage device;

second program instructions programmed to save a dynamic copy of the MWC record, wherein the dynamic copy is saved in a volatile storage device;

third program instructions programmed to receive a parallel mirrored write request of the data portion stored on the data storage device, wherein the parallel mirrored write request of the data portion writes the data portion on two or more data storage devices;

fourth program instructions to determine a first completed in time parallel mirrored write of the data portion stored on the data storage device on a first storage device of the two or more storage devices;

fifth program instructions programmed to update the MWC record to indicate the first completed in time parallel mirrored write of the data portion stored on the data storage device on the first data storage device of the two or more data storage devices;

sixth program instructions programmed to receive an indication of a failure of at least one parallel mirrored write request of the data portion on the data storage device to one or more data storage devices of the two or more data storage devices, wherein the failure causes the at least one of the parallel mirrored write requests to the one or more data storage devices of the two or more data storage devices to not occur;

seventh program instructions programmed to, responsive to receiving the indication of the failure of the at least one parallel mirrored write requests of the data portion on the data storage device to one or more data storage devices of the two or more data storage devices, determine a size of the first completed in time parallel mirrored write of the data portion on the data storage device;

eighth program instructions programmed to determine one or more parallel mirrored write request that are a different size than the size of the first completed in time parallel mirrored write of the data portion on the data storage device; and ninth program instructions programmed to update the one or more parallel mirrored write request that are a different size than the size of the first completed in time parallel mirrored write of the data portion on the data storage device using the MWC record, wherein the indicated first completed in time parallel mirrored write of the data portion on the data storage device is used to update the one or more parallel mirrored write request that are a different size than the size of the first completed in time parallel mirrored write of the data portion on the data storage device.

8. The system of claim 7, wherein the MWC record includes one or more of the following: (i) a ID used to identify a first completed in time parallel mirrored write of the data portion on the data storage device; (ii) a physical partition of a disk where the first completed in time parallel mirrored write of the data portion on the data storage device is located; and/or (iii) an offset at which the first completed in time parallel mirrored write of the data portion on the data storage device is written.

9. The system of claim 7, wherein the volatile storage device includes at least one of the following: (i) a random access memory portion located in a random access memory; and/or (ii) a firmware cache portion located in a firmware cache.

\* \* \* \* \*